United States Patent [19]

Miller et al.

[11] 4,310,369

[45] Jan. 12, 1982

[54] APPARATUS AND METHOD FOR FABRICATING A FLEXIBLE CYLINDER FROM MULTI-PLY FLEXIBLE WEB MATERIAL HAVING METAL AND PLASTIC PLIES

[75] Inventors: William P. Miller, Meriden, Conn.; Robert W. Twigg, Rockford, Ill.

[73] Assignee: Dixico Incorporated, Dallas, Tex.

[21] Appl. No.: 102,911

[22] Filed: Dec. 12, 1979

[51] Int. Cl.$^3$ ............................................... B31C 1/00
[52] U.S. Cl. .................................... 156/218; 156/272; 156/446; 156/456; 156/458; 156/379.7; 219/10.53; 493/304; 493/306
[58] Field of Search ............... 156/218, 443, 458, 459, 156/446, 456, 272, 380, 457, 215, 187, 18, 499, 544, 503, 466; 219/10.53, 10.79; 29/469.5; 72/166, 133; 113/1 B, 1 G, 113 R, 113 C, 120 D; 93/81 R, 81 MT, 77 R, 77 CL, DIG. 1; 53/DIG. 2; 493/303, 304, 306, 108, 109

[56] References Cited

U.S. PATENT DOCUMENTS

| | | | |
|---|---|---|---|
| 2,403,995 | 7/1946 | Peters | 156/218 |
| 2,697,387 | 12/1954 | Falconer | 93/81 R |
| 3,252,388 | 5/1966 | Schur | 93/81 R |
| 3,510,378 | 5/1970 | Kramer | 156/218 |
| 3,567,546 | 3/1971 | Morris et al. | 219/10.53 |
| 3,604,609 | 9/1972 | Kennedy | 219/10.79 |
| 3,730,393 | 5/1973 | Ledewitz et al. | 138/138 |
| 3,959,066 | 5/1976 | Miller et al. | 156/443 |
| 4,200,482 | 4/1980 | Magerle | 156/443 |

FOREIGN PATENT DOCUMENTS 2739239 4/1978 Fed. Rep. of Germany .

Primary Examiner—Michael W. Ball
Attorney, Agent, or Firm—McAulay, Fields, Fisher, Goldstein & Nissen

[57] ABSTRACT

An apparatus for fabricating a flexible cylinder from multi-ply flexible web material has a cylindrical forming cavity with a longitudinal opening through which the flexible web material is fed into the cavity. A non-metallic cylindrical mandrel, about which the flexible web material is fed, is mounted along the central axis of the cavity. The diameter of the mandrel is less than the diameter of the cavity in which it is disposed by an amount greater than the thickness of the web material. The web material is fed loosely around the mandrel by a feed roller to form a flexible cylinder having an internal diameter greater than the diameter of the mandrel and an outer diameter less than the internal diameter of the cavity. The amount of web material fed is enough to form a narrow longitudinal overlap zone which is heat sealed to form a longitudinal seal.

A seam presser holds the overlap seam during sealing and subsequent cooling. Finally the finished cylinder is slid from the mandrel and thereby removed from the cavity.

11 Claims, 11 Drawing Figures

APPARATUS AND METHOD FOR FABRICATING A FLEXIBLE CYLINDER FROM MULTI-PLY FLEXIBLE WEB MATERIAL HAVING METAL AND PLASTIC PLIES

BACKGROUND OF THE INVENTION

The present invention relates to an apparatus and method for fabricating cylinders from multi-ply flexible web material having outer thermo-plastic plies sandwiching a central metallic ply. More particularly, the type of flexible cylinder which the present invention is designed to produce is the type of cylinder used for the body portion of a collapsible squeeze tube such as a tooth paste tube, hair cream tube, or the like, having a central aluminum ply and outer thermo-plastic plies.

Basically, the cylinder is formed by wrapping a piece of flexible web material into a cylindrical form and then applying heat along overlapped longitudinal edges to melt or weld together thermo-plastic plies and form a seam or seal, thereby closing the cylinder.

U.S. Pat. No. 3,959,066, which issued May 25, 1976, to the Inventors of the present invention, illustrates a prior method and device for forming a flexible cylinder from multi-ply flexible web material having plastic plies. According to U.S. Pat. No. 3,959,066, briefly, the web material is cut into appropriate segments and then is fed through a longitudinal opening into a pre-form cavity wherein it is rolled approximately 360° into the form of a cylinder. A feed roller at the opening rotates continuously and a spring loaded pressure plate has an edge at the cavity opening which forces the web material against the feed roller to assure continuous feed. After the trailing edge of the segment of the web material has passed the edge of the pressure plate, contact between the feed roller and web material is lost and the seam of the "pre-form" is thus precisely located. Thereafter, the pre-form is longitudinally transferred into a non-conducting cylindrical forming cavity. Heat and pressure are applied to fuse the overlapped seam. Heat is supplied by induction heating through the walls of the forming cavity to the aluminum ply at the overlap area. Pressure is applied by means of an expandible balloon mandrel inside the rolled web material. Finally, after the overlapping edges of the web material have been fused together, the balloon mandrel is collapsed and the resulting product is shrunk slightly by cooling jackets clamped around the forming cavity. The flexible cylindrical tube body is removed from the forming cavity on a removal mandrel that has been inserted into the flexible cylinder. The removal mandrel, like the forming mandrel, is an expandible balloon mandrel. It is slipped in between the cylinder and the deflated forming mandrel and expands to hold and remove the cylinder.

Another disclosure showing method and apparatus over which the present invention is an improvement, is German patent application No. P2739239.8 laid open to public inspection on Apr. 13, 1978. The method disclosed in this German document approaches the formation of a flexible cylinder in a different manner than that disclosed in U.S. Pat. No. 3,959,066, especially, in that neither forming cavities nor expandible mandrels are used. Briefly, an appropriate length piece of flexible web material is cut and then transported to a forming station. At the forming station, the flexible web material is pressed around the bottom half of a cylindrical forming mandrel to form a U-shaped web with equal amounts of web material extending upwardly from each side of the mandrel. In a further step, these upwardly extending portions are formed tightly around the mandrel to complete the cylinder. As the mandrel is non-yielding, the heat sealing device can press downwardly against the mandrel and apply heat along the seam. When the welded seam has cooled, the formed tube is stripped from the mandrel for further processing.

This invention concerns the machine for the making of the cylindrical bodies that are used in flexible collapsible tubes. A major object of the invention is to provide such a machine which will operate at a higher speed and which will be less complex and will have fewer parts that require replacement and maintenance. These objectives in turn result in providing a less expensive cylindrical body end product.

It is a related object of this invention to increase the speed of operation of the machine and the through put of fabricated cylindrical bodies by reducing the number of steps required in the fabrication of the tubular body, by simplifying the process of removing the fabricated product from the machine and by reducing reliance on hydraulic arrangements so as to eliminate the lag time involved in the change of state of hydraulic devices.

BRIEF DESCRIPTION

In brief, in one embodiment of this invention, the multiply web material which is used to form the body of the collapsible squeeze tube is fed as sheet material between a cylindrical forming mandrel and a forming cavity. The forming cavity has a cylindrical wall that extends about 270° around. Accordingly, the housing that defines the cavity has a 90° longitudinal opening. As described below, this opening is to accomodate a seam presser. The forming mandrel is mounted within the cavity coaxial of the cavity.

Both mandrel and cavity housing are cantilever mounted at their back ends near the edge of a rotatable disk. The disk is used to move the forming cavity and forming mandrel from station to station through the various operations. The forming cavity and the forming mandrel extend forward from the face of the disk. The forward end of the forming cavity is open so that the formed cylindrical squeeze tube can ultimately be pushed out of the forming cavity off the forming mandrel.

The web material is cut from a supply roll while the web material is fed between the cavity and mandrel at the infeed station position of the disk. The spacing between the forming mandrel and the forming cavity is slightly greater than the thickness of the web material so that there is a loose fit, slightly looser than a slip-fit relationship, between web material and the forming surfaces of the mandrel and cavity. The length of web material fed into the cavity is slightly greater than the circumference of the flexible cylinder to be formed so that a longitudinal overlap zone can be formed. At this overlap zone, which in one embodiment is 1.5 mm wide, the thermoplastic material is heat sealed to form a longitudinal seam.

After the web material is fed between forming cavity and forming mandrel, the disk rotates to advance the pre-form cylinder to a heat sealing station. As the forming cavity/mandrel advances, a thin longitudinal presser plate swings inward to complete the wrapping of the web material around the mandrel and to bring and hold the longitudinal edges in the overlap position preparatory to sealing. This seam presser plate operates through the 90° cavity wall opening.

However, because of the loose fit relationship between the web material and the forming cavity wall and forming mandrel surface, the web material must be held in position against the mandrel before the seam presser plate contacts the up standing edge of the web material. Accordingly, a pair of snubbers is inserted through openings in the forming cavity housing to hold the web material against the mandrel and thus prevent the web material from shifting within the cavity while the seam presser completes the forming operation.

At the heat sealing station, the seam is sealed by radio frequency induction heating. A hairpin loop carrying R-F energy is in proximity to the seam and induces currents in the aluminum foil of the web material thereby generating heat and causing the adjacent polyethylene plies to weld together thereby effecting a longitudinal seal along the seam.

After sealing, the disk on which the cavity and mandrel is mounted rotates the cavity and mandrel to a stripper station where a stripper arm projects through the longitudinal opening in the cavity to contact the mandrel and then move forward across the mandrel pushing the formed squeeze tube cylinder out of the open end of the cavity housing.

In order to accommodate the seam presser plate at the seaming station and the stripper mechanism at the stripper station, the longitudinal opening of the cavity housing has a substantial arc of, for example, about 90°. In addition, one longitudinal edge of the cavity housing is formed by a set of crenelations thereby establishing openings or slots through which drive disks of the feed roller at the feed station fit and through which the holding snubbers fit.

At the sealing station, the heating coil is a slightly arced hairpin element thereby generating a field which intercepts the outboard edges of the seam at an oblique angle. This insures a good seal along the outer edge and in particular at the corners of the seam, presumably because the oblique R-F field avoids field cancellation at the corners of the seam.

BRIEF DESCRIPTION OF THE DRAWINGS

FIG. 1 encompasses the storage roll 24 of web material 22 which is fed into the forming unit 30 mounted on the rotatable disk 36 on which a plurality of forming units are positioned.

FIG. 2 is on a larger scale than that used for FIG. 1. FIG. 2 shows feed rollers 28 feeding web material 22 between the forming mandrel 32 and the forming cavity housing 34.

FIG. 8 is at a much greater scale than any of the other FIGS. for clarity. Further, to make the showing of the relationship between heating coil and seam clearer, the seam presser is omitted from the showing in FIG. 8. It should be kept in mind that the seam presser is non-metallic and is transparent to radio frequency.

DESCRIPTION OF THE PREFERRED EMBODIMENT

Figure 1:
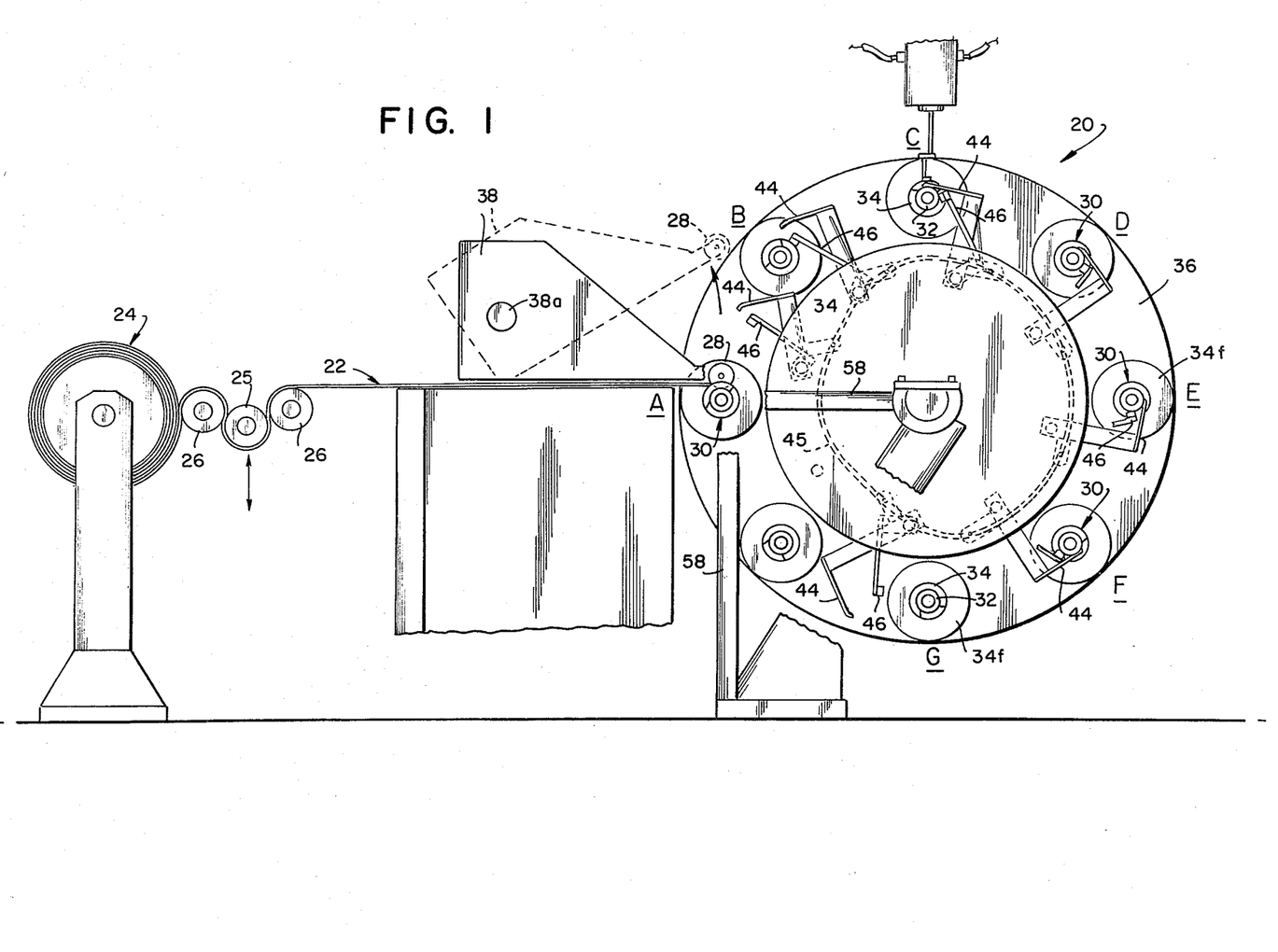
FIG. 1 is a front elevational view of a production machine embodying this invention.

FIG. 1 is a simplified front elevational view of the apparatus 20 of this invention. As shown in FIG. 1, a multi-ply web material 22 is fed from a storage roll 24 around dancer roller 25 and associated tension rollers 26 through a feed roller 28 into a forming unit 30.

Figures 2, 3, 4, 7:
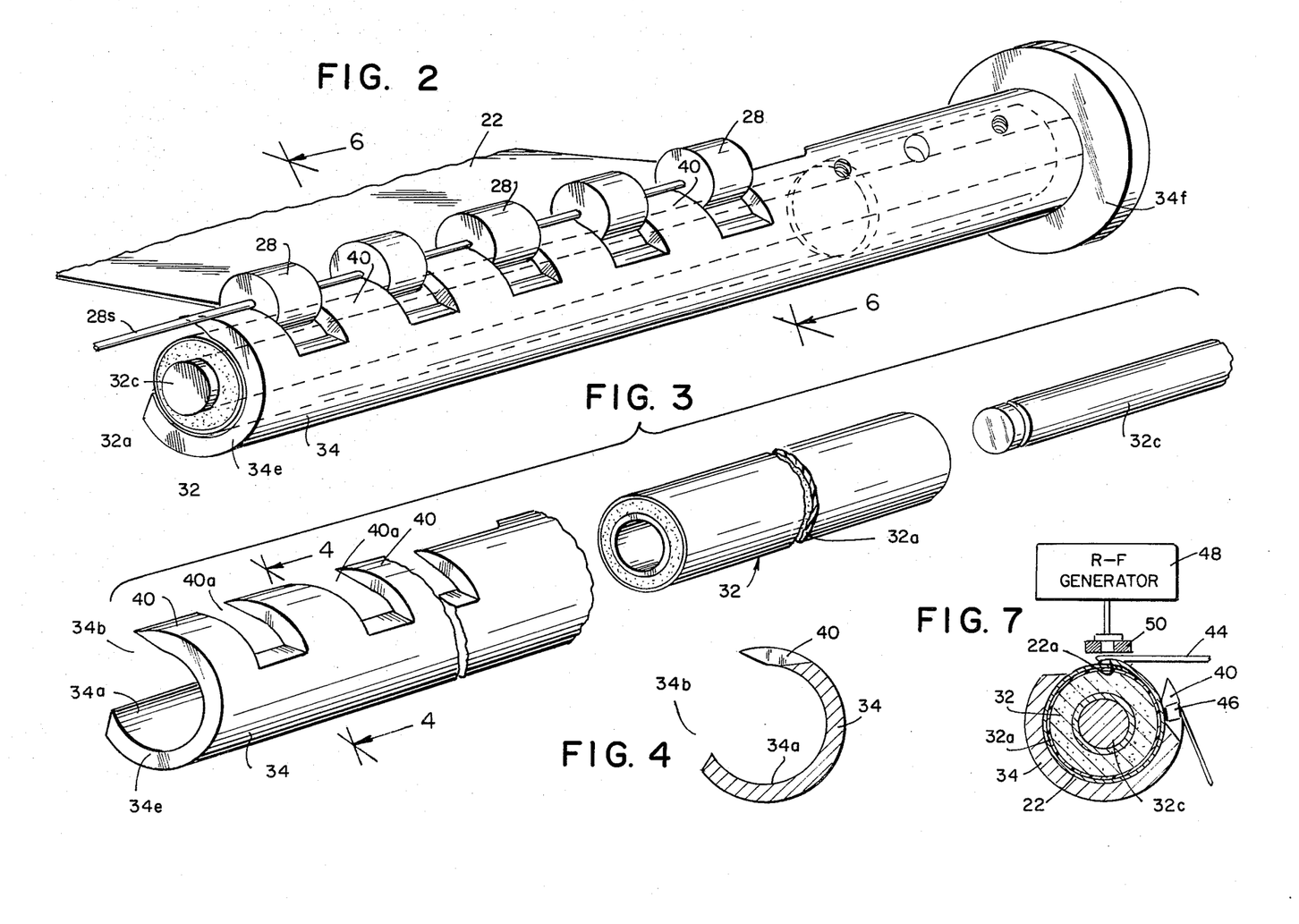
FIG. 2 is a perspective view of the forming unit 30 at the infeed station A of FIG. 1.
FIG. 3 is an exploded perspective view of the forming cavity housing 34, the non-metallic forming mandrel 32 and the metal core 32c on which the forming mandrel rotates.
FIG. 4 is a cross-sectional view of the forming cavity housing 34 and is taken along the plane 4—4 of FIG. 3.
FIG. 7 is a cross-sectional view taken at the heating station C of FIG. 1 along a plane parallel to the plane of FIG. 1. The seam overlap in FIG. 7 and associated heating coil are greatly exaggerated relative to the rest of the dimensions in FIG. 7 in order to more clearly show the overall arrangement.
Figures 5, 6, 8, 9, 10:
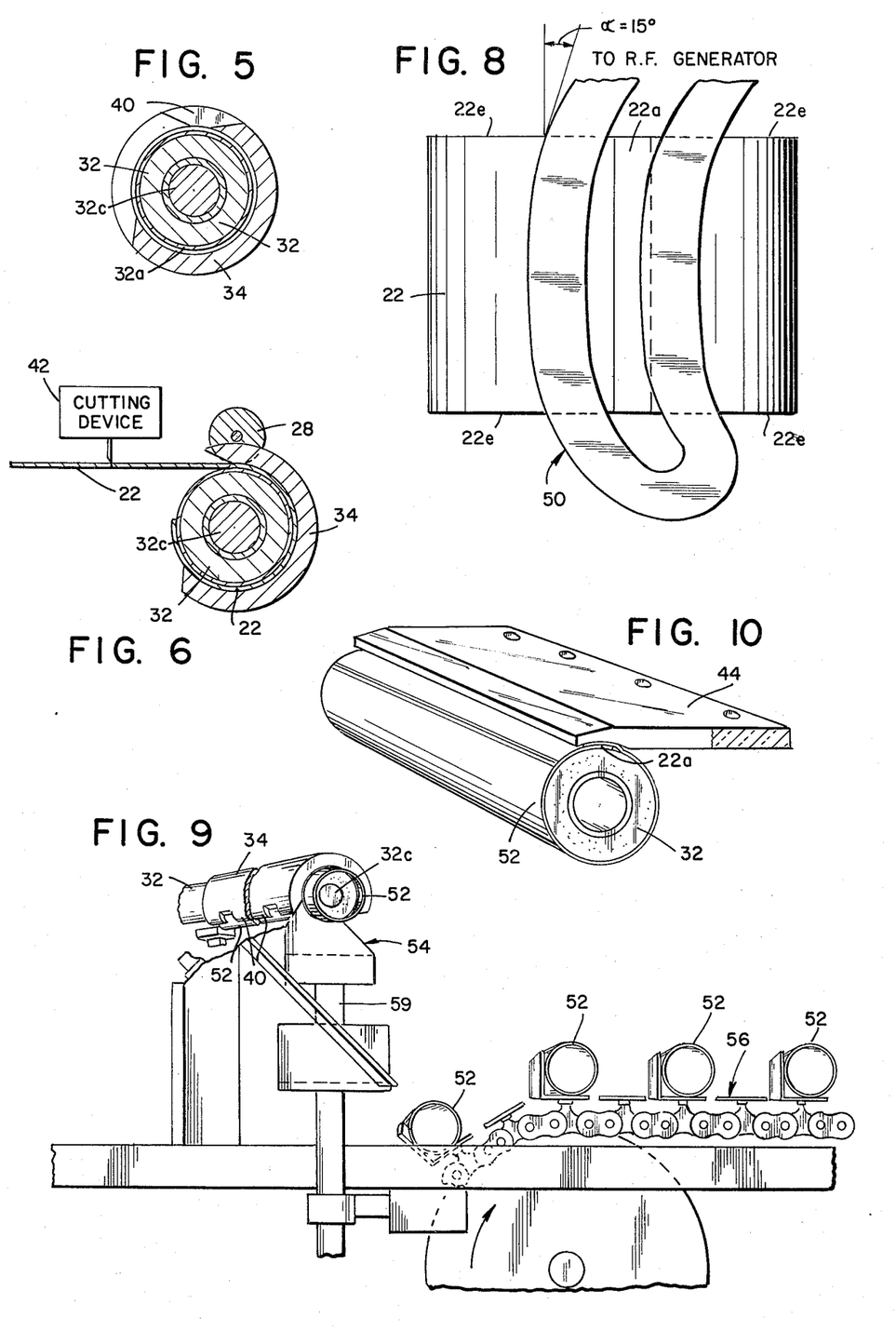
FIG. 5 is a cross-sectional view along the same plane as that of FIG. 4 but FIG. 5 is of the assembled housing 34 and mandrel 32.
FIG. 6 is a cross-sectional view along the plane 6—6 of FIG. 2 showing the infeeding of the web material 22 between forming cavity housing 34 and forming mandrel 32. The FIG. 6 cross-section is taken through one of the crenelations 40 while the FIGS. 4, 5 and 7 cross-sections are taken between crenelations 40.
FIG. 8 is a plan view showing the relationship between the R-F curved heating coil 50 and the seam 22a of the flexible cylinder at the heating station C.
FIG. 9 is a perspective view taken at the stripping station G of FIG. 1, showing the stripper 54 and the tube conveyor 56 for removing and collecting finished collapsible tubes from the forming mandrel and forming cavity.
FIG. 10 is a perspective view showing the seam presser plate 44 holding the overlapped edges of the cylinder 52 together against the mandrel 32.

As can best be seen in FIGS. 3, 4 and 5 this forming unit 30 includes a cylindrical mandrel 32 mounted within a cylindrical partial housing 34. The inner wall 34a of the housing 34 defines a cylindrical partial cavity. More specifically, the housing 34 has an inner wall 34a which has a cylindrical surface over an arc of approximately 270°. A longitudinal opening 34b in the housing 34, over an arc of approximately 90° provides, among other things access for the web 22 to be fed between mandrel 32 and housing 34. The mandrel 32 is mounted coaxial with the axis of the cavity defined by the housing 34. Both mandrel 32 and housing 34 are mounted at their rear end to a disk 36. Both are mounted in a cantilever fashion, the housing 34 being mounted to the disk 32 by a mounting flange 34f.

The disk 36 contains eight of these forming units 30 equally spaced near the periphery of the disk 36. The disk 36 has intermittent motion in moving the forming units 30 from one processing stage to the next.

The processing stages include the infeed stage A, the heating and sealing stage C, the cooling stages D, E and F and the stripper or removal stage G.

Feed rollers 28 feed the web material 22 into the forming unit 30. The feed rollers are mounted on a shaft 28s which is driven by a chain drive mechanism (not shown). Feed rollers 28, shaft 28c and drive are all mounted on bracket 38. The bracket 38 is pivotally mounted along an axis at 38a displaced from the feed rollers 28 so that the feed rollers 28 can be pivoted out of the way when the disk 26 indexes from station to station. This out of the way position for the bracket 38 and feed rollers 28 is shown in phantom in FIG. 1. The feed rollers 28 are mounted above the forming unit 30 in the operative condition at the infeed station A.

The housing 34 that defines the forming cavity is separately illustrated in FIGS. 3 and 4 because an understanding of its structure will aid in understanding the relationship shown between the housing 34 and the mandrel 32 and the feed rollers 28 as well as the relationship to the presser arm 44 and stripper arm to be described further on. The housing 34 has a cylindrical interior wall 34a which extends about 270° around the axis of the cylinder thereby defined. The longitudinal opening 34b extends about 90° around that axis. In addition along one longitudinal edge of the housing 34 there are a series of crenelations 40 which define a series of notches 40a through which the feed rollers 28 fit when the rollers 28 are in their operative position as shown in solid lines in FIG. 1. The housing 34 has an open forward end 34e and thus the housing 34 is cantilever mounted at its rear end by the flange 34f to the disk 36 (see FIG. 11).

As the forward edge of the web material 22 is fed into the forming unit 30 between the mandrel 32 and housing wall 34a, the web material is deflected around the mandrel 32 within the cavity defined by the wall 34a. When a predetermined length of web material has been fed, the material 22 is cut free of the supply. This may be achieved by use of a printed index on the web material 22 which is read by a conventional photo-electric switching arrangement (not shown). The cutting device 42 (see FIG. 6) is positioned at Station A, a predetermined short distance from the forming unit 30. When the cutting device 42 is actuated it defines the back edge of the segment of web material 22 being fed and a tab 22t of web material is left extending out of the forming unit 30. Thus, at this stage of the operation shown in FIG. 6, a partially wrapped pre-form is created.

The tab portion 22t of the web material has to be wrapped around the mandrel 32 in order to complete the formation of the pre-form. The completion of the wrapping or folding around the mandrel 32 is achieved by a seam presser 44 as the forming unit 30 indexes from station B to station C. One of the reasons why the arcuate width of the longitudinal opening 34b is as great as 90° is that it must be sufficient to accommodate the folding over of the tab 22t by the seam presser 44.

Figure 11:
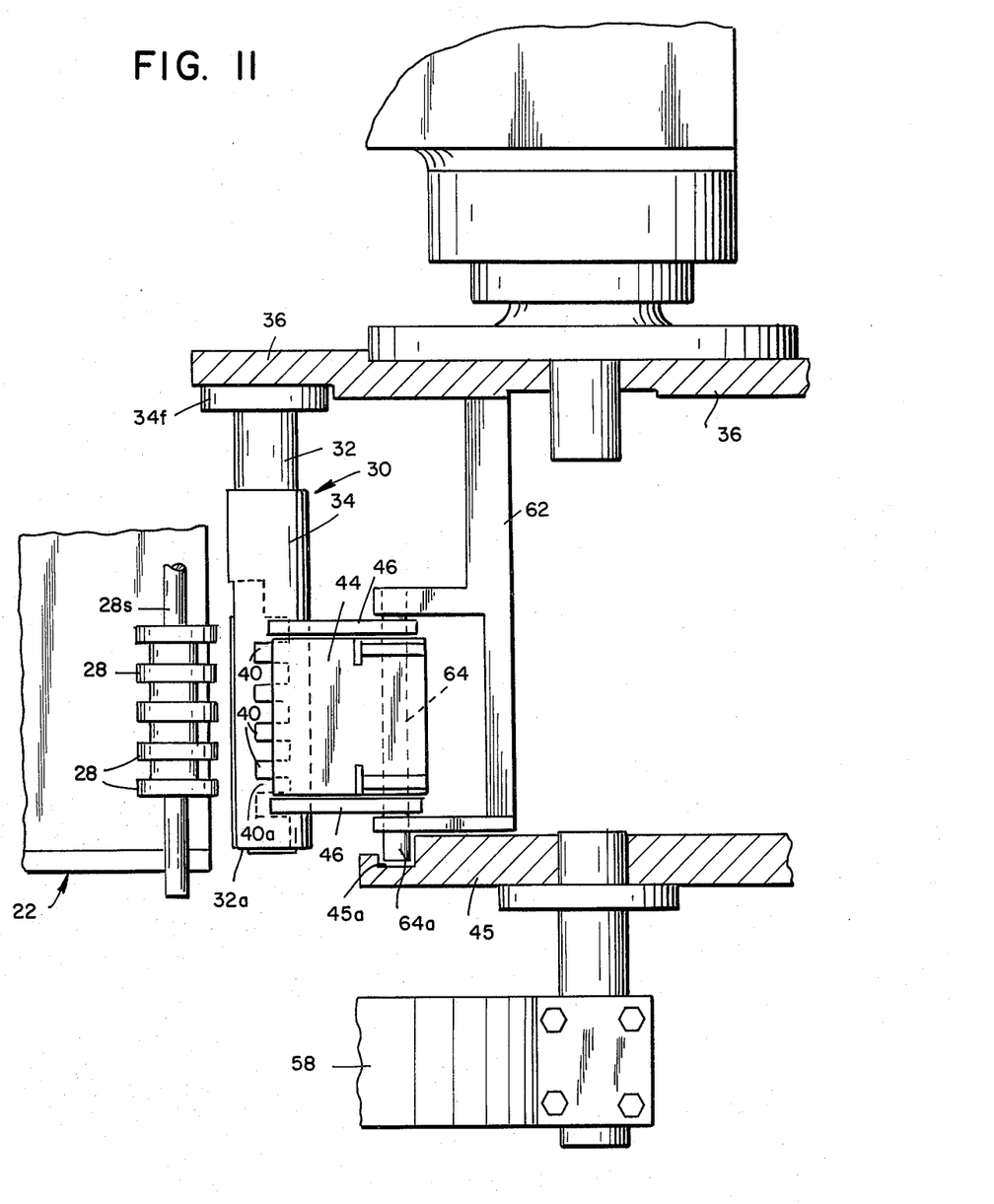
FIG. 11 is a plan view of a portion of the FIG. 1 machine showing the forming unit 30 and seam presser 44 extending forward from the disk 36.

After the cutting device 42 is operated, the forming unit 30 with the partially wrapped pre-form is indexed from station A to station B. At station B, a pair of snubbers 46 are cammed from a neutral position to a holding position by operation of the cam 45 on the shaft to which the snubbers 46 are mounted. Only one snubber 46 is shown in FIGS. 1 and 7 but both snubbers are shown in FIG. 11. When cammed down into the holding position, the snubbers 46 extend through the notches 40a between crenelations 40 and press the web material 22 against the mandrel 32 and thus keep the partially wrapped pre-form from slipping askew or rotating within the forming unit 30. In this fashion, the position of the forward edge of the segment of web material is predetermined and fixed so that the position of the seam 22a to be formed is fixed and predetermined.

The disc indexes and in the course of transit from station B to sealing and heating station C, the seam presser 44 is cammed down, by the cam 45, from a neutral position against the outstanding tab 22t to fold the tab 22t around the mandrel 32 and to cause the overlapped seam 22a to be formed at station C as shown in FIG. 7. The seam presser 44, at station C, is in its holding position against the overlapped longitudinal edges which form the seam 22a. In this holding position, the seam presser 44 holds the seam 2a down against the mandrel 32.

It is important that the snubbers 46 engage the web material 22 and press the partially wrapped pre-form against the mandrel 32 prior to any contact between the seam presser 44 and the web material 22. This is to assure that the seam presser 44 will not cause the material 22 to rotate or to slip askew. Thus the snubbers 46 serve to insure that the predetermined positioning of the seam 22a is maintained so that when the pre-form is indexed to station C the seam 22a will be positioned directly under the heating coil 50.

As is shown in FIG. 11, the forming unit 30 extends forward from the disc 36. A fork shaped support mechanism 62 also extends forward from the disc 36 and rotates with the disc 36. The snubbers 46 and the seam presser 44 are both mounted through a shaft 64 to the ends of the two arms of the fork-shaped support 62. The forward end 64a of the shaft to which the snubbers 46 and seam presser 44 are mounted extends into the cam slot 45a which is formed in the stationary cam plate 45. As the disc 36 indexes, the camming action forces the shaft 64 radically inward or outward relative to the axis of the disc 36. Adjustment in the position of the shaft 64 is effected by causing the support 62 to rotate on its own axis thereby causing the seam presser 44 and snubbers 46 to rotate between their respective neutral and holding positions.

As station C, an R-F generator 48 feeds radio frequency energy to a coil 50 which overlays the seam presser 44 and includes heat by R-F induction in the aluminum ply of the web material 22. The seam presser 44 is non-metallic and thus transparent to the radio frequency rays generated by the R-F coil 50. The R-F current induced in the aluminum ply generates heat which is sufficient to cause the thermoplastic polyethylene plies to soften and flow under pressure from seam presser 44 thereby bonding or welding the overlapping plies at the seam.

As the disk 36 continues to index in a clockwise direction, the end product cylinder 52 which has been formed by the sealing at station C cools. The seam presser remains in place throughout cooling stations D, E and F in order to insure that the seam does not open while it is cooling.

As the forming unit 30 has been indexed to station G the formed end product, the flexible cylinder 52, is removed from the forming unit 30 as best shown in FIG. 9. When the forming unit is indexed to station G, the snubbers 46 and the seam presser 44 have been cammed away from contact with the cylinder 52. A stripper 54 is moved up through the opening 34b in the housing 34 into contact with the mandrel 32 surface at a position behind the formed flexible cylinder 52. The stripper 54 then moves forward pushing the cylinder 52 out of the open front end of the forming unit 30 onto a chute which delivers the cylinder to a conveyor assembly 56 for delivery to the next state of operations.

The stripper 54 is preferably made of Delrin (trademark of E. I. du Pont de Nemours and Co., Wilmington, Del. for acetal resin material) or other similar material. The upper end of stripper 54 is shaped to fit the mandrel 32. A pneumatic cylinder 59 pushes the stripper 54 into abutment with mandrel 32 behind the formed cylinder, near disk 36. The stripper 54 is then cammed to slide forward to push the flexible cylinder 52 off the mandrel 32 to be delivered to conveyor 56 for transport as required. A leaf spring (not shown) supports the stripper 54 on the piston rod 60 of the pneumatic cylinder 59 so as to assure a relatively gentle engagement between upper surface of stripper 54 and mandrel 32.

The clearance between the inner wall 34a of housing 34 and the outer surface of mandrel 32 should be slightly greater than the thickness of the web material 22 to insure that the cylindrical body formed is essentially uniform and circular. If the clearance is made substantially greater, it has been found that the resulting cylindrical body is not uniformly circular and may be unacceptable for most commercial purposes. For example, where a flexible cylinder 52 having a diameter of about 27 mm is made of three ply web material 22 having a thickness of about 0.3 mm, a clearance of about 0.4 mm. between the mandrel 32 and the wall 34a has been found to give a commercially acceptable product. This means that after the web material 22 has been fed into the forming unit 30, only about 0.1 mm. of additional clearance exists on a radius. It has been found that much less clearance results in too tight an engagement between formed cylinder 52 and mandrel 32 or housing wall 34a thereby making it difficult to remove the formed cylinder 52 from the forming unit 30.

Because the mandrel 32 is cantilever supported at its back end from the rotatable disk 36, there is a tendency to deflect under pressure applied by the feed rollers 28 at the infeed station A. In view of the 0.1 mm. additional clearance any small deflection could seriously adversly affect the feeding of the web material 22. Accordingly, at station A there is a support structure 58 which provides support to the otherwise unsupported end of the mandrel 32. This support structure 58 is broken away in FIG. 1 in order to facilitate the showing of the forming unit 30. However, support structure 58 simply involves the two rigid arms shown in FIG. 1 extending into engagement with the forward end 32e of the metal core 32c. This end 32e extends forward from the rest of the mandrel 32 so as to provide this engagement with the support structure 58 and thus assure proper positioning of the mandrel 32 within the cavity formed by the housing 34 during the feeding operation at station A.

It may be seen that certain of the objects of this invention are achieved by the fact that the preform operation and the forming operation take place in the same unit so that no time is required to transfer from a preform cavity or device to a forming cavity. This also reduces the amount of equipment and maintainable parts required and thus eliminates the down time for maintenance and replacement. It may also be seen that the use of a cavity and mandrel relationship in which there is a slightly loose fit between the flexible cylinder 52 and the surface of the mandrel as well as a slightly loose fit between the flexible cylinder 52 and the wall 34a results in an end product which can be more readily removed from the forming unit 30 than is otherwise the case.

Because radio frequency induced heating techniques are used to weld the cylinder 52 closed, the seam presser 44 and the forming mandrel 32 are made of non-metallic materials. The seam presser 44 can be formed of such synthetic plastic materials as the known epoxy glass fiber materials which combine strength with good heat resistance. The seam presser 44 is coated at the point of sealing with a material not subject to sticking to molten polyethylene such as polytetrafluoroethylene (available under the du Pont de Nemours trademark Teflon). The forming mandrel 32 can be made of phenolic plastic materials covered with a layer 32a of polytetrafluoroethylene or other similar polymeric materials which can provide a lubricating and non-stick surface. The mandrel 32 has a steel core 32c. Although the phenolic mandrel 32 does not have to be rotatably mounted on its core 32c, it is preferably so mounted to facilitate feeding the web material 22 into the forming unit 30 by rolling as the web is fed around mandrel 32.

FIG. 8 is a schematic view looking down, at station C, of the heating coil 50 overlaying the web material 22. The purpose of FIG. 8 is to show the geometric configuration of the heating coil 50 and its relationship to the underlying web material 22 and in particular its relationship to the seam 22a. In order to more clearly show these relationships, the seam presser 44, which lies between the coil 50 and material 22 is deleted as are the underlying mandrel 32 or surrounding housing 34. In one application of the invention, a collapsible and flexible cylinder 52 is made that has a length of about 135 mm., a circumference of about 85 mm. and an overlap seam 22a width of about 1.5 mm. The coil 50 is approximately the banana shaped hairpin type of coil shown in FIG. 8. More specifically, the coil 50 is composed of a wire that has a 4.5 mm. on a side square cross section. This wire is bent into the configuration shown. It is flat in the plane of the FIG. 8 showing but has a somewhat convex curvature facing the direction from which the preformed web material 22 is advanced. The positioning of the coil 50 in the horizontal plane relative to the seam 22a is not particularly critical except that the seam 22a should be fully within the main field generated by the R-F current going through the coil 50 and thus should be centered under that coil 50 somewhat as is shown in FIG. 8.

More importantly, it has been found that each leg of the coil 50 should overlie the cylinder top and bottom edges 22e at an oblique angle. In particular, an oblique angle of 85° or, an angle $\alpha$ of 15°, as shown in the FIG. 8, has been found useful. What has been found is that this angular relationship near the top and bottom edges 22e of the cylinder assures that the corners of the seam 22a will heat and be sealed. The center portion of the legs of the coil 50 need not be so angled or particularly curved. It is only the end portions of the legs which overlie the top and bottom edges 22e of the flexible cylinder that require this angular relationship. It has been found that without this angular relationship, the corners of the seam 22a do not reliably seal. It is believed that the reason that such occurs is that the field generated by the current in the aluminum ply tends to oppose the field generated by the coil 50 and that this opposition becomes more pronounced because of the edge effects at the edges 22e.

What is claimed is:

1. The method for forming flexible cylindrical bodies from a web material on cylinder forming units arranged around the periphery of a rotatable disk comprising the steps of:

feeding said web material between a cylindrical cavity and a cylindrical mandrel mounted within said cavity on a first one of said cylinder forming units, the clearance between said mandrel and said cavity being only slightly greater than the thickness of said web material, said clearance being large enough to assure ready passage of the web material between said mandrel and said sidewall and being small enough to assure the formation of an essentially uniform and circular cylindrical body from said web material, said cavity being defined by a housing having a longitudinal opening to which web material is fed, the width of said longitudinal opening being substantially greater than the width of the longitudinal seam to be made, stopping said step of feeding prior to completion of a complete 360° preform to provide a partially wrapped preform, holding said partially wrapped preform against the mandrel to fix the position of the preform on the mandrel and to predetermine the circumferential position of the forward edge of said material on said mandrel, folding the back edge of said web material through said longitudinal opening and over the forward edge of said material to complete the preform and to establish an overlapped longitudinal edge seam zone, and indexing said rotatable disk to bring said complete preform to a sealing station, sealing the overlapped longitudinal edges to each other to form the seal and complete the cylindrical body, repeating said steps of feeding, stopping, holding and folding on a second one of said cylinder forming units while the cylindrical body of said first one of said cylinder forming units is being sealed and completed.

2. The method of claim 1 wherein the web material comprises at least one outer ply of thermoplastic materials and one metallic material ply, and the step of sealing and overlapped edges together comprises applying RF induced heating of the metallic ply at the same zone to cause the thermoplastic material plies at the seam zone to fuse.

3. Apparatus for fabricating a flexible cylinder from flexible web material comprising:

a housing having a cylindrical cavity defined by a cylindrical sidewall, said housing having a longitudinal opening through said sidewall into said cavity, said opening extending over a substantial arc of the cylinder defined by said cavity, said sidewall extending over the major portion of said cylinder, said longitudinal opening having a length adapted to receive the web material, a cylindrical mandrel mounted within said cavity, the diameter of said mandrel being less than the diameter of said cavity to provide clearance between the surface of said mandrel and said sidewall, said clearance being slightly greater than the thickness of the web material to be used, said clearance being large enough to assure ready passage of the web material between said mandrel and said sidewall and being small enough to assure the formation of an essentially uniform and circular cylindrical body from said web material, a feed roller movable between a drive position and a neutral position, said feed roller when in said drive position extending through an opening of said housing to feed a segment of web material into said space between said mandrel and said sidewall to form a partially wrapped preform and to press whatever web material is fed through said longitudinal opening in said housing against said mandrel, said feed roller retracting to said neutral position when said preform is partially wrapped a predetermined amount, a seam presser movable between a holding position and a neutral position, said seam presser when in said holding position extending through said longitudinal opening in said housing, said seam presser moving from said neutral position to said holding position after said feed roller has retracted to said neutral position and when moving from said neutral position to said holding position contacting the trailing longitudinal edge portion of said web material and folding it down over the leading longitudinal edge portion of said web material to complete the wrapping of said preform about said mandrel, said seam presser when in said holding position holding overlapped longitudinal edges of said web material together under pressure against said mandrel thereby defining a seam for the cylinder to be formed, said arc to said longitudinal opening being sufficient to accommodate the seam presser and to receive the trailing edge portion of said web as it is folded down, and at least one snubber movable between a holding position and a neutral position, said snubber when in said holding position extending through an opening in said housing to contact whatever web material has been fed between said mandrel and said sidewall to hold said web material in a predetermined position relative to said mandrel and said housing, said snubber moving from its neutral position to its holding position prior to said seam presser moving from its neutral position to its holding position.

4. The apparatus of claim 3, wherein said mandrel is supported at one end only, further comprising temporary support means operable to temporarily support the free end of said mandrel when said feed roller is in its driving position.

5. The apparatus of claim 3 wherein:

one portion of said longitudinal opening of said housing is in the form of a series of crenelations to provide a series of spaced apart notches, said feed roller comprising a plurality of spaced apart disc portions extending radially outwardly from the axis of said feed roller, and said disc portion extends through said notches when said feed roller is in said drive position.

6. In the apparatus of claims 3 or 5, wherein it is intended to use multi-ply material, at least one of the plies being a thermoplastic material; further comprising:

a sealing device positioned adjacent the seam formed by said seam presser, said sealing device including means operable to melt the thermoplastic material for welding the material into a sealed flexible cylinder.

7. In the apparatus of claim 6, for use with multi-ply material having one electrically conducting ply, said sealing device including an r-f source, and said seam presser being of a non-electrically conducting material.

8. The apparatus of claim 7, wherein said r-f source comprises a banana-shaped hair-pin antenna mounted for disposition adjacent the top of said seam presser.

9. Apparatus for fabricating a flexible cylinder from flexible web material comprising:

a housing having a cylindrical cavity defined by a cylindrical sidewall, said housing having a longitudinal opening through said sidewall into said cavity, said opening extending over a substantial arc of the cylinder defined by said cavity, said sidewall extending over the major portion of said cylinder, said longitudinal opening having a length adapted to receive the web material, a cylindrical mandrel mounted within said cavity, the diameter of said mandrel being less than the diameter of said cavity to provide clearance between the surface of said mandrel and said sidewall, said clearance being slightly greater than the thickness of the web material to be used, said clearance being large enough to assure ready passage of the web material between said mandrel and said sidewall and being small enough to assure the formation of an essentially uniform and circular cylindrical body from said web material, a feed roller movable between a drive position and a neutral position, said feed roller when in said drive position extending through an opening of said housing to press whatever web material is fed through said longitudinal opening in said housing against said mandrel to aid in feeding said web material between said mandrel and said sidewall, a seam presser movable between a holding position and a neutral position, said seam presser when in said holding position extending through said longitudinal opening in said housing, said seam presser when moving from said neutral position to said holding position contacting the trailing longitudinal edge portion of said web material and folding it down over the leading longitudinal edge portion of said web material to complete the wrapping of said preform about said mandrel, said seam presser when in said holding position holding overlapped longitudinal edges of said web material together under pressure against said mandrel thereby defining a seam for the cylinder to be formed, said arc of said longitudinal opening being sufficient to accomodate the seam presser and to receive the trailing edge portion of said web as it is folded down, at least one snubber movable between a holding position and a neutral position, said snubber when in said holding position extending through an opening in said housing to contact whatever web material has been fed between said mandrel and said sidewall to hold said web material in a predetermined position relative to said mandrel and said housing, a rotatable disk; said housing, mandrel, seam presser and snubber being mounted at the periphery of said disk, to provide a flexible cylinder forming unit, a plurality of said flexible cylinder forming units being disposed around the periphery of said rotatable disk, each of said flexible cylinder forming units progressing from an infeed station to a heating and sealing station to a removal station as said disk rotates, said feed rollers being positioned off said disk at said infeed station, and said seam presser moving between its neutral position and its holding position as said disk rotates from said feed station to said sealing station, said seam presser being in its holding position when the associated unit is at said sealing station.

10. The apparatus of claim 9 wherein said mandrel is cantilever mounted and said cavity is open ended near the unmounted end of said mandrel, further comprising:

stripper means mounted off said disk at said removal station, said stripper means having a first position extending through said longitudinal opening of said housing and biased against said mandrel and, when in first position, operable to move longitudinally along said mandrel to slide whatever flexible cylinder is disposed about said mandrel off said mandrel and out of said cavity through said open end of said cavity.

11. The apparatus of claims 3, 5, 4 or 9 wherein said mandrel is rotatable.

* * * * *

UNITED STATES PATENT AND TRADEMARK OFFICE
CERTIFICATE OF CORRECTION

PATENT NO. : 4,310,369
DATED : January 12, 1982
INVENTOR(S) : William P. Miller and Robert W. Twigg It is certified that error appears in the above—identified patent and that said Letters Patent is hereby corrected as shown below:

Col. 9, line 34 (in claim 2) change "at the same zone" to --at the seam zone--.

Col. 10, line 17 (in claim 3) change "said arc to said longitudinal opening" to --said arc of said longitudinal opening--.

Signed and Sealed this

Third Day of August 1982

[SEAL]

Attest:

GERALD J. MOSSINGHOFF

Attesting Officer     Commissioner of Patents and Trademarks